Dec. 22, 1942.   E. A. ROCKWELL   2,306,346
VALVE MECHANISM
Original Filed May 18, 1934

INVENTOR
Edward A. Rockwell
BY
Arthur Wright
ATTORNEY

Patented Dec. 22, 1942

2,306,346

UNITED STATES PATENT OFFICE 2,306,346

VALVE MECHANISM

Edward A. Rockwell, Forest Hills, N. Y., assignor to General Auto Parts Corporation, a corporation of Delaware Original application May 18, 1934, Serial No. 726,426, now Patent No. 2,163,764, dated June 27, 1939. Divided and this application November 19, 1938, Serial No. 241,313

6 Claims. (Cl. 121—46.5)

My invention relates particularly to an apparatus involving a valve mechanism designed for amplifying power but which has application especially for the operation of automotive accessories, as, for instance, automobile brakes.

This application is a division of my copending application Serial No. 726,426, filed May 18, 1934, upon Fluid pressure amplifying devices, now Patent No. 2,163,764.

It has for an object provision by which the work performed in causing the actuation of the device is amplified by the actuation thereof. Another object is the provision of the above character adapted to the control and actuation of automotive apparatus. A further purpose is the provision of valving control of apparatus remote from the valving means and pressure source.

While my invention is capable of being carried out in many different ways, for the purpose of illustration I have shown only certain embodiments of the same in the accompanying drawing, in which—

Figure 1:
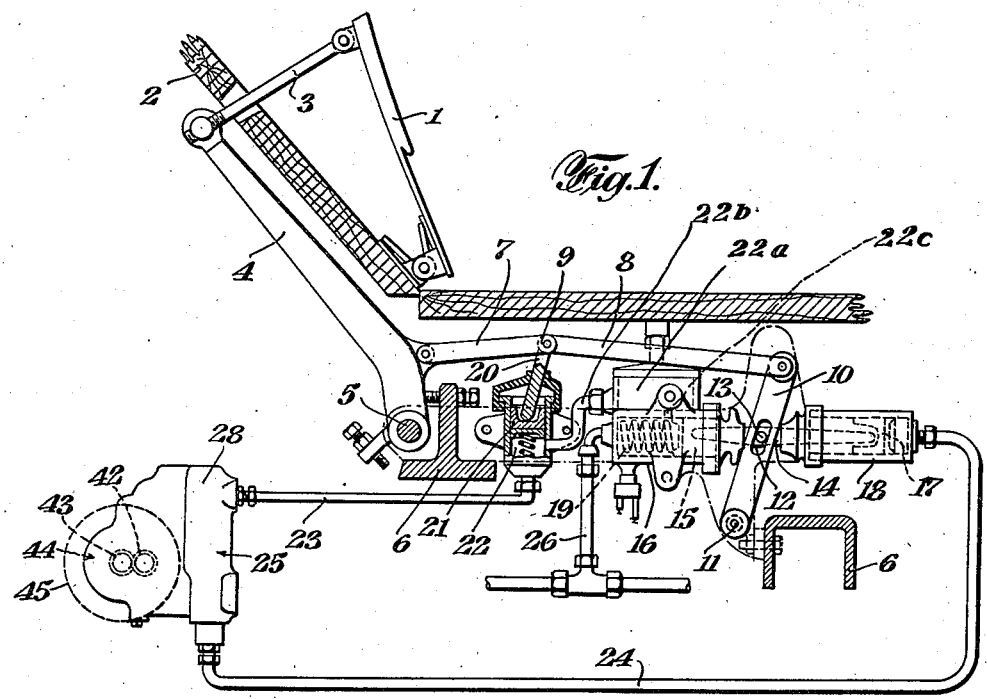
Fig. 1 is a side elevation of a valve system made in accordance with my invention.

Referring to the drawing, I have shown a foot pedal 1 mounted on a floor-board 2 of an automobile and connected by a link 3 to a lever 4 carried on a shaft 5 secured to the frame 6 of the automobile. Pull links 7 and 8 angularly pivoted together at 9 connect the lever 4 with a second lever 10 which swings on a stationary pin 11 carried by the automobile frame 6. A slot 12 in the lever 10 engages a pin 13 fixed in a rod 14 disposed between a piston 15 of a master brake cylinder 16 and a piston 17 of a booster cylinder 18. A compression spring 19 urges the piston 15 outwardly. A push-rod 20 is located between the pivot 9 and a piston 21 in a reaction cylinder 22. There is also provided a compensating liquid supply reservoir 22a having a port 22c leading to the cylinder 15 and a pipe 22b leading to the cylinder 22. Control and high pressure tubes 23 and 24, respectively, connect the reaction cylinder 22 and the booster cylinder 18 with a control valve 25. A fluid line 26 leads from the master cylinder 16 to the brakes of the automobile.

The valve 25 is constructed in the following manner. A sleeve 27 is tightly held within a casing 28 and is provided with slots 29 and 30 in communication with high and low pressure chambers 31 and 32, respectively. The sleeve 27 is provided with an upper internal shoulder 33, and a hollow piston 34, slidable within the sleeve 27, is provided with lateral ports 35 and 36 adapted to register with the slots 29 and 30 respectively. The piston 34, furthermore, is formed with a bottom flange 37 and is urged upwardly by a spring 38 backed by a bushing 39 threaded into the casing 28. The bushing 39 receives a fitting 40 for connecting thereto the pressure supply line 24. A spring 40a at the top of the piston 34 controls its upward movement. The low pressure chamber 32 leads by a passageway 41 to gear pump gears 42 and 43 in a gear pump 44. The gears 42 and 43 may be driven from any suitable source of power in any desired way but, for example, may be driven by an electric motor 45 on the shaft of the gear 43 and which may be started and stopped in any desired way, designed to maintain a uniform pressure in the high pressure chamber 31, which is connected to the delivery side of the gear pump 44 through a ball check valve 46 and passageways 47 and 48.

Figures 2, 3:
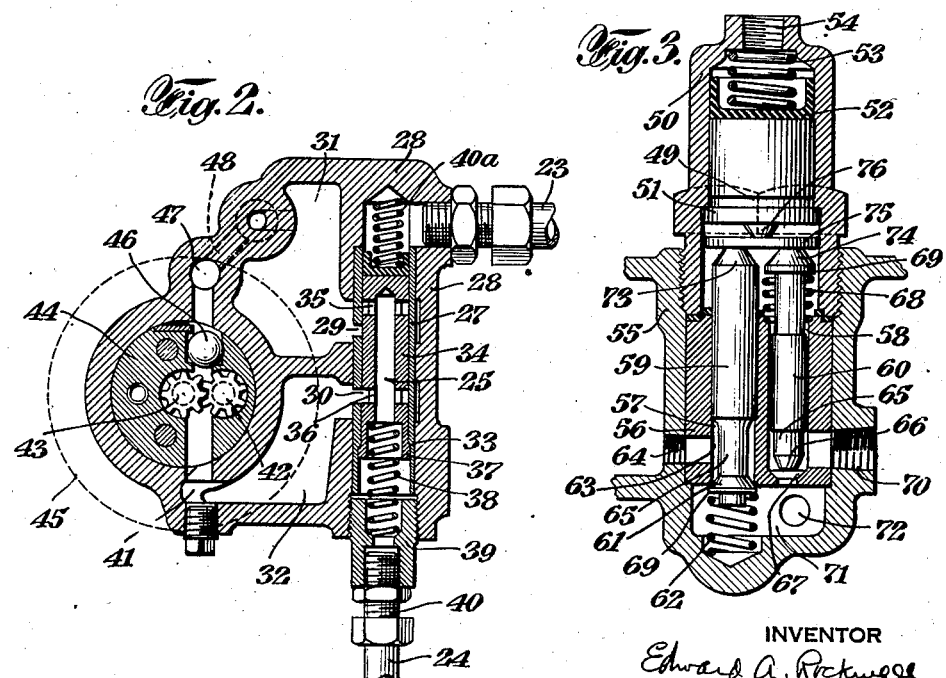
Fig. 2 is a vertical section through the valve for controlling the application of power.
Fig. 3 is a vertical section through a modified form of control valve.

The alternative form of valve shown in Fig. 3 employs an actuating piston 49 of relatively large diameter, slidable in a cylinder 50 and having a stop flange 51 to define its upper position. The usual sealing washer 52 and follower spring 53 are disposed above the piston 49 and an upper threaded hole 54 is provided in the cylinder 50 for a tube connection to a source of modulating pressure such as the reaction cylinder 22 by the pressure pipe 23. The cylinder 50 is screwed into a body 55 and clamps therein a plug 56 having vertical holes 57 and 58, in which are slidable a high pressure valve plunger 59 and a low pressure valve plunger 60, respectively. The plunger 59 has a conical head 61 normally seated against the lower end of the hole 57 by a strong compression spring 62 and is necked above the head 61 to leave an annular space 63 in the hole 57. A high pressure inlet 64 opens into the annular space 63. The low pressure plunger 60 has a lower reduced portion 65 terminating in a cone 66 adapted to engage a seat 67 of relatively small diameter in the bottom of the hole 58. A relatively light spring 68 under a head 69 on the plunger 60 normally holds the latter up so that the cone 66 is spaced from the seat 67. The numeral 70 indicates a threaded lower pressure passage, opening out of the hole 58 near the bottom thereof. The plug 56 and body 55 define a modulated pressure chamber 71 having an outlet 72. The plungers 59 and 60 have conical upper ends 73 and 74 engaging a disk 75 which centrally engages a conical nose 76 on the bottom of the piston 49.

The operation in Figs. 1 and 2 is as follows: Assuming the hydraulic system to be initially filled with liquid and the electric motor 45 to have been operated until its circuit is broken, due to obtaining the desired pressure within the high pressure cylinder 31 by drawing the hydraulic fluid from the low pressure chamber 32, if it is desired to apply the brakes the foot pedal 1 is moved downwardly, thereby moving the piston 15 and forcing the hydraulic fluid manually through the pipe system 26 to the automobile brakes. At the same time movement of the pull links 7 and 8 will cause the downward movement of the push-rod 20 so as to force the modulated hydraulic fluid, according to the amount of pressure applied by the foot, through the control pipe 23 and thence to the top of the piston 34, forcing the same downwardly so as to close the low pressure port 36 and open the high pressure port 35, so that as a result the high pressure fluid passes through the line 24 into the booster cylinder 17 to thus boost the pressure in the pipe line 26. This boosting effect, of course, cooperates with the manual pressure from the pedal 1, but does not of itself appreciably change the position of the valve means, as, owing to the angularity of the links 7 and 8 the downward movement of the piston 21 can be brought about only by a pull on the link 7 due to pressing downwardly on the pedal 1. As pressure builds up in the pipe 24 it reacts by moving the pedal 1 slightly upwardly on the valve 34, moving the same upwardly and holding the pressure constant in said pipe 24, unless the manually applied pressure on the piston valve 34 is changed. Upon release of the foot pressure, the piston valve 34 rises to close the high pressure port 35 and open the low pressure port 36, thus releasing the high pressure liquid from the booster 18 through the pipe 24 and releasing the manual pressure on the fluid in the pipe 23 and the cylinder 22, which then communicates with the tank 22a by the pipe 22b.

The modification of the invention shown in Fig. 3 operates in a similar manner. Accordingly, when pressure is applied above the piston 49 through the hole 54 the conical nose 76 presses down on the disk 75. The spring 62 being stronger than the spring 68 the latter yields and the disk 75 rocks downwardly on the conical upper end 73 of the plunger 59 as a fulcrum, forcing plunger 60 downwardly until the cone 66 closes against the seat 67, and thereby shuts off the low pressure communication from the chamber 71 to the passage 70. As additional pressure is applied to the piston 49, the disk 75 rocks downwardly on the conical upper end 74 of the plunger 60 as a fulcrum, overcoming the spring 62 and forcing the conical head 61 away from its seat, thereby admitting high pressure fluid from the inlet 64 to the chamber 71 and thence through the outlet 72 to the device to be actuated. As pressure builds up in the chamber 71 it reacts by moving the pedal 1 slightly upwardly, on the bottom of the head 61 moving the latter up against its seat in opposition to the piston 49 and holding the pressure constant in the chamber 71 unless the applied pressure on the piston 49 is changed. If additional pressure is applied to the piston 49 a corresponding increase of pressure is caused in the chamber 71. If the pressure from the pedal 1 against the piston 49 is further lowered the force urging the plunger 75 60 downwardly is decreased and the pressure in the chamber 71 against the lower end of the plunger 60 raises the latter, allowing pressure to exhaust from the chamber 71 through the passage 70. From the above description it will be noted that in its functioning the alternative valve follows substantially the operation of the type previously described and gives the same modulation effect.

While I have described my invention above in detail I wish it to be understood that many changes may be made therein without departing from the spirit of the same.

I claim:

1. A hydraulic valve structure comprising a chamber, fluid pressure inlet and outlet valve means closing in said chamber, a spring normally closing the inlet valve, the inlet valve being closed in a position neutral to the inlet of pressure fluid, and common means, including a sealed piston provided with a spring having a fixed support, reactive to the pressures admitted beyond the inlet valve, operable by hydraulic pressure to alternately actuate the same.

2. A hydraulic valve structure comprising a chamber, fluid pressure inlet and outlet valve means closing in said chamber, a spring normally closing the inlet valve, the inlet valve being closed in a position neutral to the inlet of pressure fluid, and common means, including a sealed piston provided with a spring having a fixed support, reactive to the pressures admitted beyond the inlet valve, to alternately open and close each of said valves.

3. In a hydraulic control valve structure in combination, a body having a cylindrical bore, a port in said bore adapted to connect said bore with a source of hydraulic pressure, a vent in said bore, a passage adapted to connect said bore with a pressure responsive device, a sleeve valve slidable in said bore and seated in a position neutral to the inlet of pressure liquid and having openings adapted alternately to connect said ports with said passage, means, including a sealed piston provided with a spring having a fixed support, to move said sleeve in opposition to the pressure in said passage, and resilient means to normally position said sleeve to open said vent port.

4. In a hydraulic control valve structure in combination, a body having a cylindrical bore, a port in said bore adapted to connect said bore with a source of hydraulic pressure, a vent port in said bore, a passage adapted to connect said bore with a pressure responsive device, a sleeve valve slidable in said bore and seated in a position neutral to the inlet of pressure liquid and having openings adapted alternately to connect said ports with said passage, hydraulic means, including a sealed piston provided with a spring having a fixed support, to move said sleeve in opposition to the pressure in said passage, and resilient means to normally position said sleeve to open said vent port.

5. In a hydraulic control valve structure in combination, a body having a cylindrical bore, a port in said bore adapted to connect said bore with a source of hydraulic pressure, a vent port in said bore, a passage adapted to connect said bore with a pressure responsive device, a sleeve valve slidable in said bore and seated in a position neutral to the inlet of pressure liquid and having openings adapted alternately to connect said ports with said passage, hydraulic means including a sealed piston slidable in sealing relation in said body, provided with a spring having a fixed support, and engaging said sleeve to move said sleeve in opposition to the pressure in said passage, and resilient means to normally position said sleeve to open said vent port.

6. In a hydraulic control valve structure in combination, a body having a cylindrical bore, a port in said bore adapted to connect said bore with a source of hydraulic pressure, a vent port in said bore, a passage adapted to connect said bore with a pressure responsive device, a sleeve valve slidable in said bore and seated in a position neutral to the inlet of pressure liquid and having openings adapted alternately to connect said ports with said passage, hydraulic means including a sealed piston slidable in said body and resilient means connecting said piston and said sleeve to said body, to move said sleeve in opposition to the pressure in said passage, and resilient means to normally position said sleeve to open said vent port.

EDWARD A. ROCKWELL.